(12) United States Patent
Bengtson et al.

(10) Patent No.: US 10,078,312 B2
(45) Date of Patent: Sep. 18, 2018

(54) WIND POWER PLANT WITH HIGHLY RELIABLE REAL-TIME POWER CONTROL

(75) Inventors: John Bengtson, Aarhus (DK); Niels Erik Danielsen, Brabrand (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 531 days.

(21) Appl. No.: 14/008,721

(22) PCT Filed: Mar. 23, 2012

(86) PCT No.: PCT/DK2012/050089
§ 371 (c)(1),
(2), (4) Date: Oct. 21, 2013

(87) PCT Pub. No.: WO2012/130241
PCT Pub. Date: Oct. 4, 2012

(65) Prior Publication Data

US 2014/0049046 A1   Feb. 20, 2014

(30) Foreign Application Priority Data

Mar. 30, 2011   (DK) .................. 2011 70149

(51) Int. Cl.
*G05B 9/03*   (2006.01)

(52) U.S. Cl.
CPC ...................... *G05B 9/03* (2013.01)

(58) Field of Classification Search
CPC .................. G05B 9/03; F03D 9/005
USPC ............................. 700/295; 290/44
See application file for complete search history.

(56) References Cited

U.S. PATENT DOCUMENTS

| | | | | |
|---|---|---|---|---|
| 3,614,327 A | * | 10/1971 | Low ................... | G08C 15/06 327/408 |
| 4,219,308 A | * | 8/1980 | Bottrell .............. | F03D 7/0224 416/151 |
| 4,569,015 A | * | 2/1986 | Dolev ................. | G06F 15/161 709/201 |
| 4,593,396 A | * | 6/1986 | Anderson, Jr. ...... | G06F 11/16 714/47.1 |

(Continued)

FOREIGN PATENT DOCUMENTS

WO   WO 2009109655 A1 * 9/2009 ............. F03D 7/042

OTHER PUBLICATIONS

Visscher "Grid tied converter with virtual kinetic storage", p. 1-7, PowerTech, 2009 IEEE.*

(Continued)

*Primary Examiner* — Kenneth M Lo
*Assistant Examiner* — David J Wynne
(74) *Attorney, Agent, or Firm* — Patterson + Sheridan, LLP

(57) ABSTRACT

The present invention relates to a fault-tolerant control system for a wind power plant comprising a plurality of power units, the control system comprising control means for generating a replica of essentially concurrent power unit set-point values, a data communication network for transmitting the essentially concurrent power unit set-point values to the plurality of power units and a plurality of decentralised voting means being arranged so that a decentralised voting means is assigned to each power unit, each decentralised voting means being adapted to select one power unit set-point value out of the replica of power unit set-points. The present invention further relates to an associated method.

20 Claims, 4 Drawing Sheets

(56) References Cited

U.S. PATENT DOCUMENTS

| | | | | |
|---|---|---|---|---|
| 5,557,623 | A * | 9/1996 | Discoll | G06F 1/14 714/797 |
| 6,061,809 | A | 5/2000 | Glaser et al. | |
| 6,178,522 | B1 * | 1/2001 | Zhou | G06F 11/181 714/11 |
| 8,957,535 | B2 * | 2/2015 | Hjort | F03D 7/0272 290/44 |
| 2005/0117596 | A1 * | 6/2005 | Kopetz | H04J 3/0655 370/401 |
| 2006/0210389 | A1 * | 9/2006 | St-Germain | F03D 3/005 415/4.2 |
| 2006/0214428 | A1 | 9/2006 | Altemark et al. | |
| 2007/0147232 | A1 | 6/2007 | Takehara et al. | |
| 2008/0018516 | A1 * | 1/2008 | Meagher | G06F 11/182 341/155 |
| 2008/0118354 | A1 * | 5/2008 | Jeppesen | F03D 7/0224 416/1 |
| 2009/0160187 | A1 * | 6/2009 | Scholte-Wassink | F03D 7/0284 290/44 |
| 2009/0216910 | A1 * | 8/2009 | Duchesneau | G06F 9/5072 709/250 |
| 2009/0309360 | A1 | 12/2009 | Jurkat | |
| 2010/0268849 | A1 * | 10/2010 | Bengtson | G05B 15/02 709/248 |
| 2010/0280672 | A1 * | 11/2010 | Llorente Gonzalez | H02J 3/38 700/287 |
| 2010/0299550 | A1 * | 11/2010 | Bengtson | F03D 7/047 713/375 |
| 2010/0307619 | A1 * | 12/2010 | Komatsu | F04D 15/0066 137/565.33 |
| 2011/0148112 | A1 * | 6/2011 | Ormel | F03D 7/042 290/44 |
| 2012/0020786 | A1 * | 1/2012 | Ayres | F03D 7/047 416/1 |

OTHER PUBLICATIONS

Elia ("Analysis of Ethernet-based safe automation networks according to IEC61508", p. 333-340, IEEE, 2006).*
International Search Report, PCT/DK2012/050089, dated Jul. 5, 2012.
DK Search Report, PA 2011 70149, dated Dec. 7, 2011.

* cited by examiner

# WIND POWER PLANT WITH HIGHLY RELIABLE REAL-TIME POWER CONTROL

FIELD OF THE INVENTION

The present invention relates to a method of establishing a highly reliable real-time power control system for wind power plants.

BACKGROUND OF THE INVENTION

In a wind power plant it is known art to perform real-time control of the power output from each wind turbine or sub-station to comply with grid requirements. The control typically takes place from a central power plant controller unit in a sub-station and may involve control of active power, reactive power, frequency, current and/or voltage.

As wind power plants increase in size and power output, the consequences of failure in the control of the power plant becomes more severe.

New grid compliance codes pose requirements to reliable and deterministic power output from power plants in both normal operational scenarios and in case of grid failures inside or outside the wind power plant.

Wind power plants are more and more often relied on in relation to compensating the grid in case of grid failures outside the wind power plant.

It is therefore desirable to have a power plant control system that is highly reliable characterized in:
  Very high reliability in the power plant controller system. By "very high reliability" is here understood that the power plant controller system has properties that with very high probability guarantee correct power plant control in normal operational scenarios, in single-failure scenarios and possibly also in double or multiple failure scenarios.
  Very high reliability in the power plant communication network used for power plant control. By "very high reliability" is here understood that the communication network has properties that with very high probability guarantee delivery of correct data in both normal operational scenarios, single-failure scenarios and possibly also in double or multiple failure scenarios.
  Hard real-time properties in the communication network between the power plant controller and/or power plant resource controllers and the connected wind turbines and sub-stations. By "hard real-time" is here understood that the communication network has properties that with very high probability guarantee delivery of data within a specified deadline in all load scenarios.

The requirement for very high reliability in the power plant control is supported by fault-tolerance in the power plant control system and power plant communication system. The requirement is further supported by decentralized voting schemes, said decentralized voting schemes aiming at selecting the most reliable wind turbine set point value among a plurality of available wind turbine set point values.

Fault-tolerant control systems for wind power plants are typically implemented as redundant systems comprising duplicates of various critical plant modules/devices. In case a critical plant module/device fails its functionality is taken over by a similar plant module/device.

US 2009/0309360 and US 2009/0309361 discuss a method and a system for controlling a wind energy park. In US 2009/0309360 and US 2009/0309361 a main communication unit controls a number of prioritised control units. In case a given control unit with a given priority fails, the main communication unit selects a lower prioritised control unit to take over the functionality of the defective control unit.

It is a disadvantage of the method and system suggested in US 2009/0309360 and US 2009/0309361 that the main communication unit selects which control unit to take over in case another control unit breaks down or in any other way malfunctions. However, in case the main communication unit itself breaks down, no replacement unit is available.

Thus, the control method and the control system suggested in US 2009/0309360 and US 2009/0309361 can not be considered a fault-tolerant control method/system—at least not on the main communication unit level.

It may be seen as an object of embodiments of the present invention to provide highly reliable real-time power plant control in a wind power plant.

DESCRIPTION OF THE INVENTION

The above-mentioned object may be complied with by providing, in a first aspect, a real-time fault-tolerant control system for a wind power plant comprising a plurality of power units, the control system comprising
  control means for generating a replica of essentially concurrent power unit set-point values,
  a data communication network for transmitting the replica of essentially concurrent power unit set-point values to the plurality of power units, and
  a plurality of decentralised voting means being arranged so that a decentralised voting means is assigned to each power unit, each decentralised voting means being adapted to select one power unit set-point value out of the replica of power unit set-point values.

The term "power unit" should be understood broadly and it may thus cover a wind turbine or other types of power generating or power supplying units, such as for example an energy storage unit. Obviously, the power units of the wind power plant may be a combination of different types of power units, i.e. wind turbines, energy storage units etc.

Replica generation of essentially concurrent power unit set-point values may be provided by letting a plurality of control means operate on same data, execute the same functions at the same time, and thus be replica deterministic.

The following advantages are associated with the first aspect of the present invention:
  The control system architecture of the present invention may fulfil the high requirements to reliability that are posed on modern wind power plant control systems.
  The control system architecture of the present invention may fulfil the requirements to a reliable real-time control in a modern wind power plant control system.
  The control system architecture of the present invention may integrate functional safety and it may be able to support both low demand modes, high demand modes and continuous mode classes of safety-related functions as specified in the IEC61508 standard.
  The control system architecture of the present invention may be scalable and flexible in a way that enables tailoring of functionality to various wind turbine platforms and to various power plant layouts.

The power plant control system architecture may comprise power plant controllers and related sensors systems. Moreover, the power plant control system architecture may comprise a number of power units. Examples of power units could be wind turbine power converter systems and energy storage power converter systems.

The control system architecture of the present invention may apply fault-tolerant real-time communication networks (RTCNs) with high reliability and safety-related properties.

The fault-tolerant control system may further comprise main controller means adapted to generate reference signals for the control means for generating the replica of essentially concurrent power unit set-point values. The centralised main controller means may comprise a supervisory control and data acquisition system (SCADA) for generating reference signals to the control means.

Moreover, a fault-tolerant sensor system comprising a plurality of sensors may be provided. Preferably, the plurality of sensors are arranged in a redundant manner. The plurality of sensors are adapted to measure at least one electrical parameter at or near a point of common coupling. This includes measurements of for example voltage, current, active power, reactive power, frequency etc.

The data communication network may comprise a real-time communication network, such as a time-triggered Ethernet. The time-triggered Ethernet communication network may be implemented as a single fault-tolerant network or a double- or multi fault-tolerant network. The real-time communication network may be capable of supporting safety-related communication of data.

In a second aspect the present invention relates to a wind power plant comprising a fault-tolerant control system according to the first aspect. As previously mentioned the plurality of power units may comprise one or more wind turbines and/or one or more energy storage units.

In a third aspect, the present invention relates to a method for controlling, in real-time, a wind power plant comprising a plurality of power units, the method comprising the steps of generating a replica of essentially concurrent power unit set-point values, transmitting the power unit set-point values to the power units in the wind power plant via a data communication network, performing, at each power unit, a decentralised voting process comprising the step of selecting one power unit set-point value out of the replica of power unit set-point values, and applying, at each power unit, the selected power unit set-point value to the power unit.

Again the term "power unit" should be understood broadly and it may thus cover a wind turbine or any other types of power generating or power supplying units, such as for example an energy storage unit. Obviously, the power units of the wind power plant may be a combination of different types of power units, i.e. wind turbines, energy storage units etc.

The power unit set-point values may be applied to a number of wind turbines in the wind power plant. Alternatively or in combination therewith the power unit set-point values may be applied to a number of energy storage units in the wind power plant. The generated power unit set-point value may as well be applied to all power units in the wind power plant.

In a fourth aspect the present invention relates to a method for controlling a wind power plant comprising a plurality of power units, the method comprising the steps of providing a global time within the wind power plant, synchronizing power switching in power units in accordance with the global time, performing synchronized interleaved power switching between power units, and performing synchronized variable frequency switching in and between power units.

In a fifth aspect the present invention relates to a fault-tolerant control system for a wind power plant comprising a plurality of power units, the control system comprising control means for generating a replica of essentially concurrent measured values, a data communication network for transmitting the replica of essentially concurrent measured values to the plurality of power units, and a plurality of decentralised voting means being arranged so that a decentralised voting means is assigned to each power unit, each decentralised voting means being adapted to select one measured value of the replica of measured values.

BRIEF DESCRIPTION OF THE DRAWINGS

The present invention will now be explained in further details with reference to the accompanying figures, where.

Figure 1:
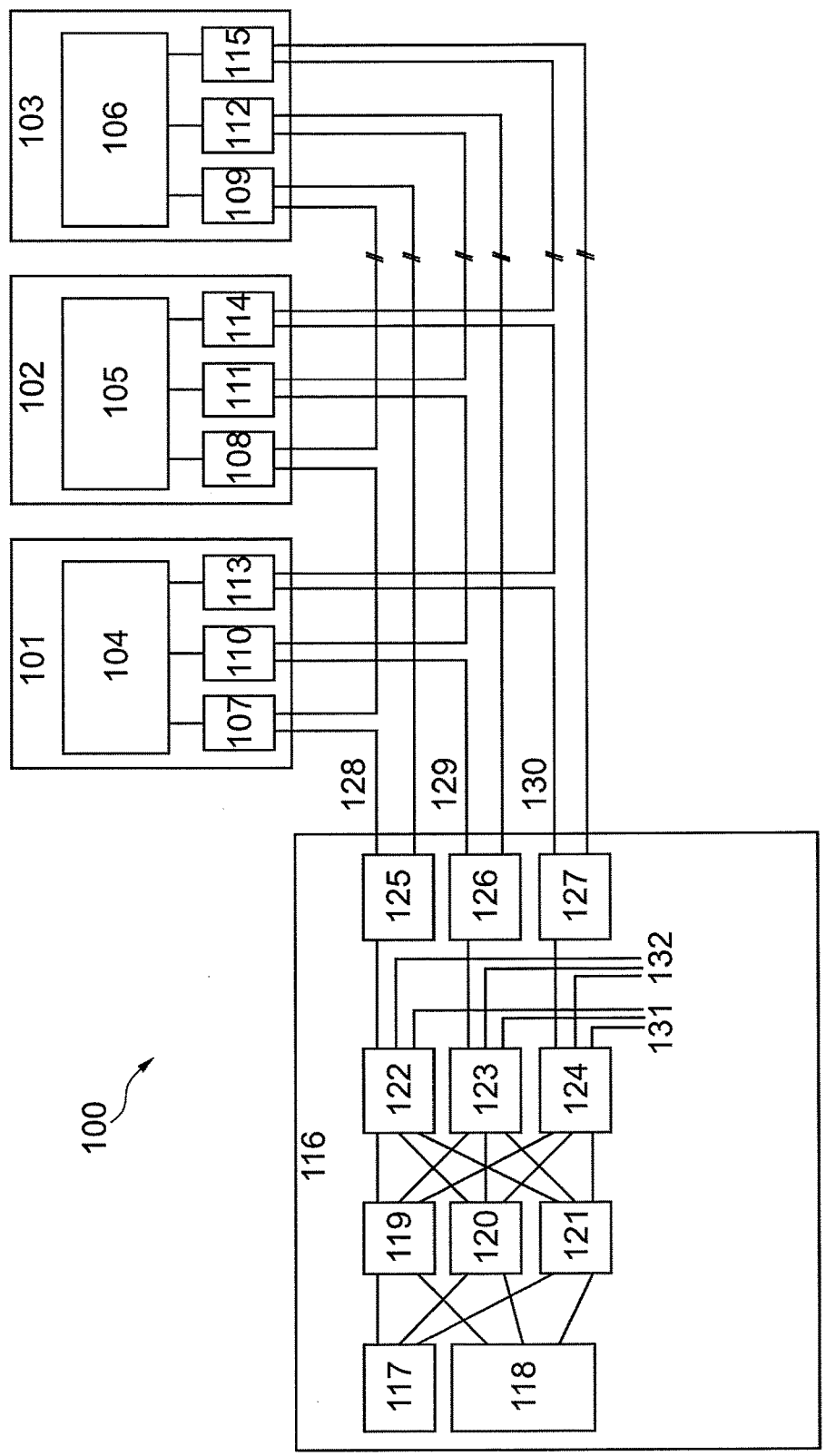
FIG. 1 shows a first embodiment of a power plant control system.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims

DETAILED DESCRIPTION OF THE INVENTION

In general, the present invention aims at providing a fault-tolerant control system for wind power plants. The control system architecture of the present invention generally reflects the established design principle "form follows function".

According to the present invention fault-tolerant control in wind power plants is accomplished by providing a method and a system that support decentralized voting—i.e. where the selection of a power set-point is performed at the site of a power generating/supplying unit, such as a wind turbine or a power storage unit.

Thus, the power control capability is not limited to control wind turbine output power. Other suitable power generating/supplying units with the capability to provide power to the grid may be an energy storage facility controlled by the power plant controller.

Power set-points may reflect the power (active and/or reactive), the frequency, the voltage or the current to be generated either by a wind turbine, or by another power generating/supplying unit within the wind power plant, with the overall purpose of ensuring that the power output of the entire power plant is conformant with the grid codes that applies to the power plant grid connection.

In addition, the present invention will enable:
improved power quality at grid interface
improved stability of power plant optimised power plant efficiency improved availability and power production of the power plant under fault conditions reduced size and cost of grid power filters In the following the present invention will be described with references to a wind power plant comprising a plurality of wind turbines. It should be understood however that these wind turbines could be replaced or supplemented by other types of power generating/supplying units without departing from the scope of the present invention.

Referring now to FIG. 1 a layout of a wind power plant control system 100 according to an embodiment of the present invention is depicted. As seen in FIG. 1 a sub-station 116 is connected to n wind turbines 101-103 via m data communication networks 128-130.

Each wind turbine 101-103 comprises a wind turbine power controller (WTPC) 104-106 or optionally multiple wind turbine power controllers in n+m redundant configuration, and a number of Communication Network Switches (CNS) 107-115 connected thereto. Each CNS 107-115 is cascade-coupled with other CNS's of other wind turbines to form ring-shaped communication paths 128-130 between the sub-station 116 and the n wind turbines 101-103. The ring-shaped communication paths 128-130 are connected to the sub-station 116 via Distribution CNS devices 125-127. Each Distribution CNS serves one of the ring-shaped communication paths 128-130.

Ring-shaped communication paths 128-130 allow that one wind turbine CNS 107-115 may fail without making the other wind turbines in the ring lose contact to other CNS's within the same communication path. In an embodiment of the invention, data is communicated in both directions on the ring-shaped communication paths 128-130 to obtain a higher fault tolerance. An alternative to the ring shaped connection path can be a star-connection having a distribution CNS as a centre point could be established.

In general it should be noted that the present invention is not limited to a particular topology of the communication path. Any topology, cascade-coupled line, cascade-coupled ring, star-coupled or a combination hereof may be utilized.

Each WTPC 104-106 has a built-in voter for voting between values of set-points or data values provided by redundant power plant controllers (PPCs) 119-121, redundant sensor systems 118 or other redundant data sources in one or more sub-stations via the wind turbine CNS's 107-115. Each communication path 128-130 communicates the set-points or data values to the connected wind turbines. Thus, for wind turbine 101 the voter of the WTPC 104 is adapted to vote between set-points or data values provided by the corresponding redundant power plant controllers 119-121 and/or sensor systems 118 through the redundant communication paths 128-130.

A possible scenario could be that the voter votes in accordance with the principle "2 out of 3" (2oo3)—i.e. if one of the set-point values deviates significantly from the 2 others, the deviating set-point value is ignored. As a consequence one of the two comparable set-point values is selected and subsequently applied to the power controller.

It should be noted that the voting principle applied depends on the control system layout, and it may thus differ from the before-mentioned 2oo3 principle.

The sub-station 116 shown in FIG. 1 comprises a SCADA 117 controlling a plurality of redundantly arranged PPCs 119-121. In addition, each PPC receives measured data from a number of sensors of a fault-tolerant sensor system 118. The fault-tolerant sensor system may comprise a plurality of redundantly arranged sensors being positioned at or near a point of common coupling (PCC) of the wind power plant. The sensors can be connected directly to the PPC's or they can be communicated to the PPC via a local field bus or they can be communicated via the communication network by connection to the CNS.

As depicted in FIG. 1 the sensor sub-system 118 provides its measured data (power, frequency, voltage, current etc.) to the three PPCs 119-121. In a preferred embodiment of the invention, the same data is provided to the PPCs 119-121 at essentially the same time.

This allows the PPCs 119-121 to process the same data at the same time, and thus produce the same output as long as the PPCs 119-121 has no internal failure. This principle ensures "replica determinism" between set-points from the PPCs. This property prevents erroneous voting in the power units caused by different computational trajectories in the PPCs from occurring.

In replica deterministic systems a desired property of the nodes is "fail-silent", which means that the nodes will fail to a passive state in case of internal failure. This property is enforced in the design of the PPCs.

Each PPC 119-121 receives a reference signal from the SCADA 117 and generates a wind turbine set-point value in accordance therewith. The wind turbine set-point values are provided to the wind turbines in the wind power plant via independently operable data communication networks 128-130. Thus, with reference to FIG. 1 each of the wind turbines 101-103 receive two or three independently generated wind turbine set-point values depending on the level of fault tolerance in the PPC system. The voter incorporated in each WTPC 104-106 votes and selects one valid set-point of the set-point values.

The distribution of turbine set-point values takes place through Distribution CNS's 125-127 positioned within the sub-station 116. The CNS's are implemented in two or more instances to support the desired fault-tolerance. A distribution CNS can support multiple independent wind turbine data communication networks and, thus, multiple rows of wind turbines in a wind power plant.

Before being distributed on the data communication networks 128-130 the generated wind turbine set-point values may be passed through two or three Control CNS's 122-124 positioned within the sub-station. This allows that the set-point values may be passed on to other Distribution CNS groups 131-132, thus enabling control of further wind turbines in a wind power plant.

Figure 2:
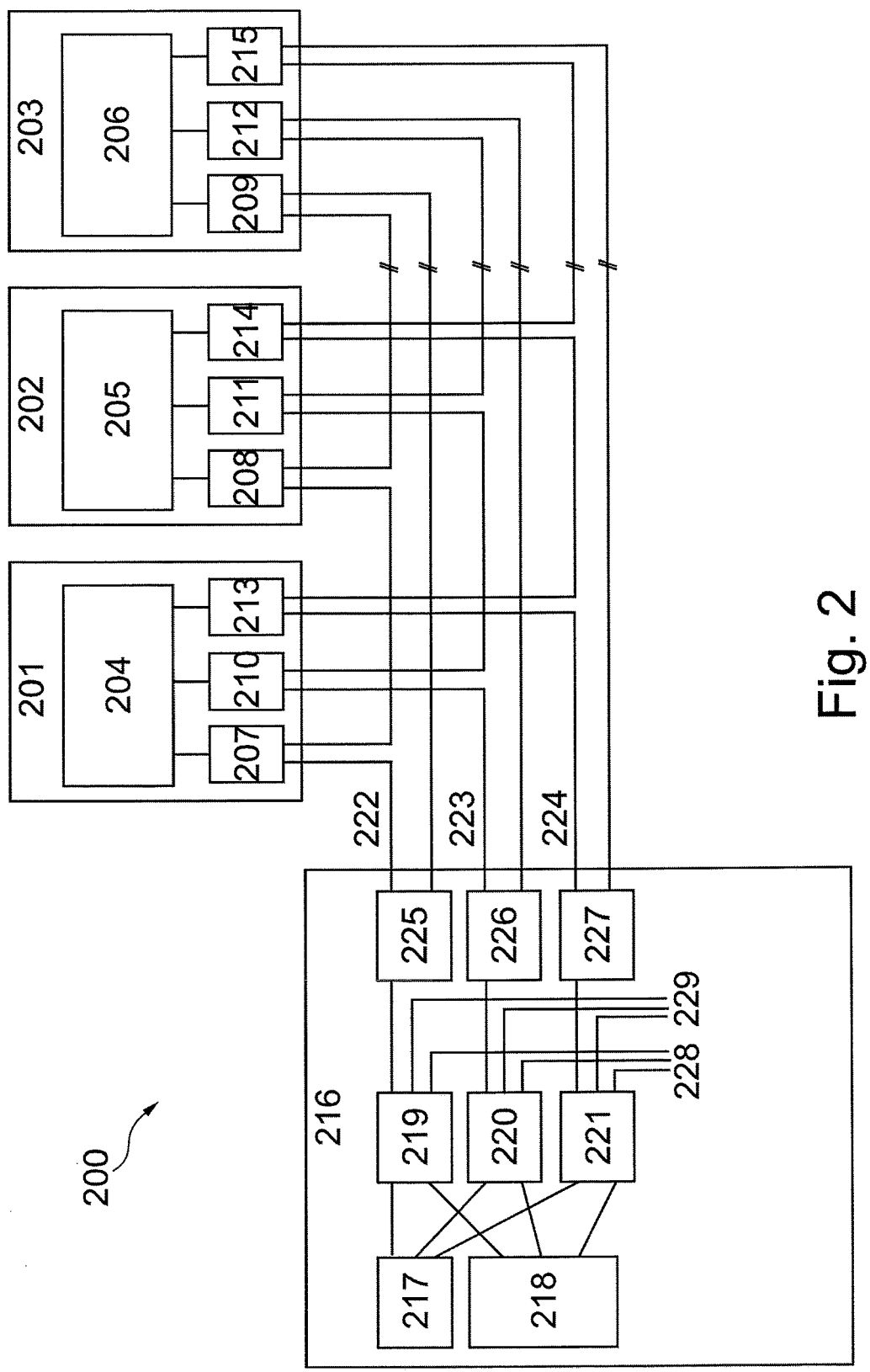
FIG. 2 shows a second embodiment of a power plant control system.

FIG. 2 shows another embodiment of the layout of a wind power plant control system 200. Compared to FIG. 1 the PPC's 119-121 of the sub-station 216 are omitted. The functionalities of the PPC's are instead incorporated into the WTPC's 204-206 of the wind turbines 201-203.

Fault-tolerant sensor data is distributed to the WTPC system 204-206 in the wind turbines through the Control CNS's 219-221 and the Distribution CNS's 225-227 within the sub-station 216. Similar to the embodiment shown in FIG. 1 each CNS 207-215 is cascade-coupled with other CNS's of other wind turbines to form ring-shaped communication paths 222-224 between the sub-station 216 and the n wind turbines 201-203. Set-point values may be passed on to other Distribution CNS groups 228-229 via Control CNS's 219-221, thus enabling control of further wind turbines in a wind power plant.

As previously mentioned the present invention is not limited to a particular topology of the communication path. Any topology, cascade-coupled line, cascade-coupled ring, star-coupled or a combination hereof may be utilized.

In the embodiments shown in FIGS. 1 and 2, the PPC and CNS systems may be single fault-tolerant, utilizing two instances of PPC and CNS or they may be double fault-tolerant, utilizing three instances of PPC and CNS.

In the embodiments shown in FIGS. 1 and 2, the data communication network should be a highly reliable network and exhibit real-time capabilities that guarantee delivery of data within a specified deadline with very high probability.

Preferably the power plant control system should be capable to communicate hard real-time set-point values with 1 ms, 500 µs, 100 µs or even shorter intervals.

Suitable networks could be Ethernet/IP, Ethernet POWERLINK, EtherCAT, SERCOS III, PROFInet-IRT, TTEthernet or other data communication networks with similar properties.

In a preferred embodiment of the invention, the RTCN is a highly deterministic communication network with time-triggered properties. Such network could be TTEthernet or other communication network with similar properties. This type of RTCN makes data available at essentially the same time on the redundant RTCN channels and thus provides strong support for fault-tolerance at system level.

TTEthernet combines the advantages of the time-triggered communication paradigm with the flexibility of the wide spread Ethernet. It supports standard Ethernet traffic while ensuring non-interference with critical data traffic. In such communication paradigms, the communication of real-time data on the RTCN is planned in the design phase and the associated nodes have a priori knowledge of when data is available.

The TTEthernet also provides a fault-tolerant precision global time to all nodes in the system. These properties enable that two or more replica nodes by subscription to the same data can be guaranteed to operate on the same data at the same time and, due to the precision global time, be designed to execute the same functions at essentially the same time, and thus be replica deterministic.

In a preferred embodiment of the invention, the RTCN has specific properties that support "continuous mode" safety-related functions as defined in the IEC61508 standard. Continuous mode safety functions would depend on safety-related data communicated between nodes on the RTCN to perform the safety function. TTEthernet inherently supports continuous mode safety functions by its fault-tolerant and safety-related properties. The TTEthernet communication system is safety certifiable. By utilizing this type of communication network, the capability of the fault-tolerant architecture of the present invention can be extended to comprise all classes of safety functions: low demand mode, high demand mode and continuous mode safety functions in accordance with the definitions in the IEC61508 standard.

The power plant control system dependability can further be characterized in:
  The probability of failure to perform power plant control can be guaranteed to Safety Integrity Level 2 (SIL2) in accordance with the definition in the IEC61508 standard.
  The probability of failure to perform power plant control can be guaranteed to Safety Integrity Level 3 (SIL3) in accordance with the definition in the IEC61508 standard.

In distributed systems, fault-tolerance and real-time properties can be supported by the establishment of a precise global time where the nodes have a common notion of time that deviates very little—typically in the range of a microsecond or less, however not limited to this precision. The global time supports:

Synchronization of data acquisition across nodes
  Synchronization of processes across nodes
  Synchronization of data communication (time-triggered communication)
  Replica determinism in fault-tolerant controllers and distributed nodes The global time can be established by implementation of an IEEE-1588 compatible Precision Time Protocol in the wind turbine and across the wind power plant. Alternatively, the global time can be established by utilizing the inherent support for a precision global time that is part of many industrial RTCNs. In systems where the precision global time is critical to system availability and/or safety, a sufficient level of fault-tolerance and reliability must be established in the distribution of the precision global time to support this. TTEthernet supports a global time with very high reliability properties.

The global time domain may comprise the entire wind power plant or only parts hereof.

A particular aspect of the global time is the ability to synchronize power switching in the wind turbines and other power plant applications. This ability can support interleaved power switching within the wind turbines and sub-station applications and across wind turbines and sub-station applications in the wind power plant. The global time can also support synchronized variable frequency switching that can reduce narrow-band noise emission from the switching systems. Combinations of interleaved switching and frequency switching may be beneficial. The purpose of the power switching alignment is reduction of filter systems, reduction of electromagnetic interference and reduction of electric noise at the grid connection.

Figure 3:
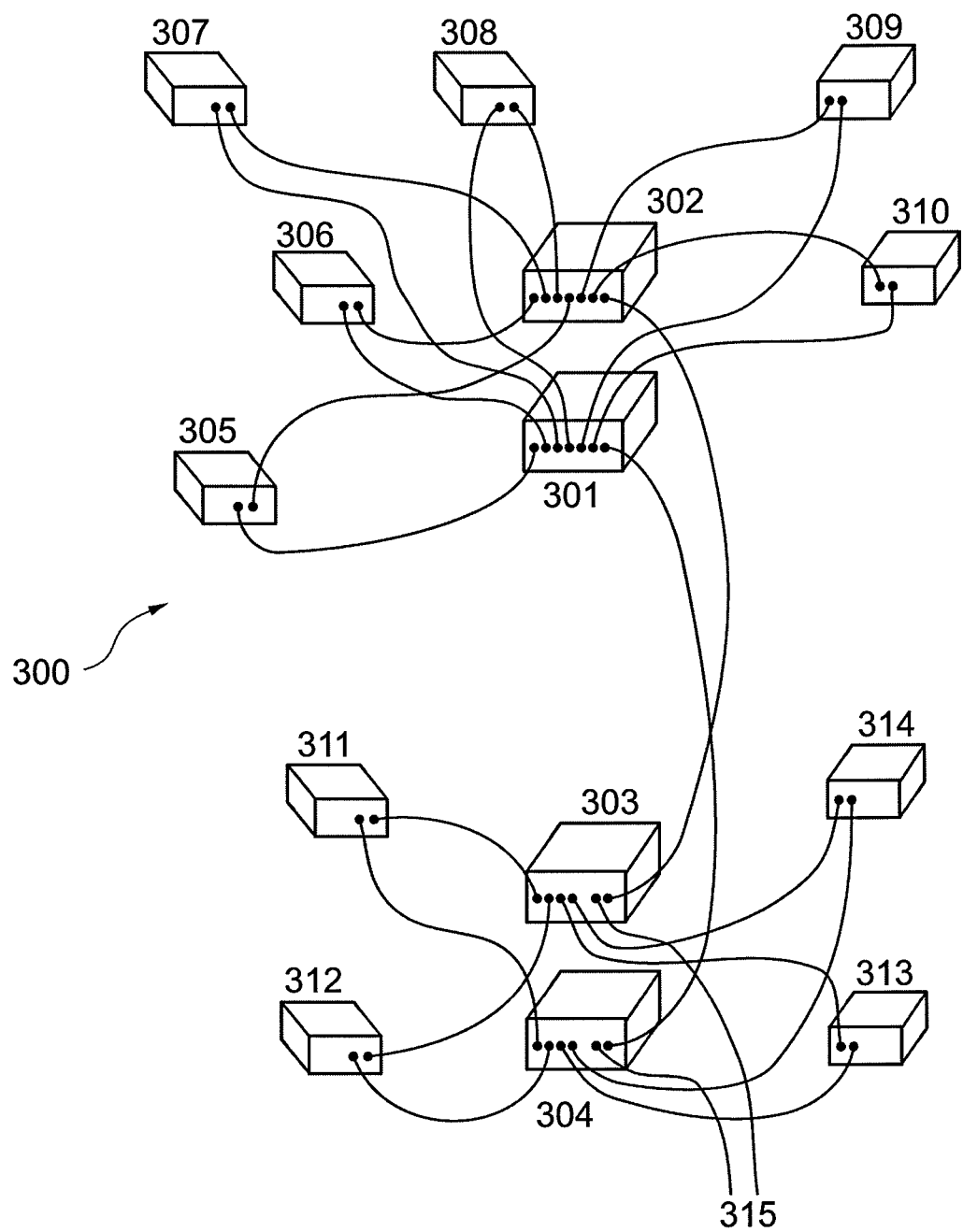
FIG. 3 shows an exemplified single fault-tolerant communication network.

Referring now to FIG. 3, the DCNs 305-314 in the fault-tolerant control system 300 are connected by redundant CNs. FIG. 3 exemplifies a single fault-tolerant CN 300 applying redundant communication switches 301-304. This structure satisfies the fault-tolerance required for high system reliability. In relation to the current invention, a DCN could be a WTPC.

Each DCN 305-314 typically comprises a distributed control system unit which either alone or in combination with other distributed control system units of other DCNs 305-314 form the complete control system of a given wind turbine or power plant sub-system. Communication with other communication switches is offered via the redundant communication path 315.

Figure 4:
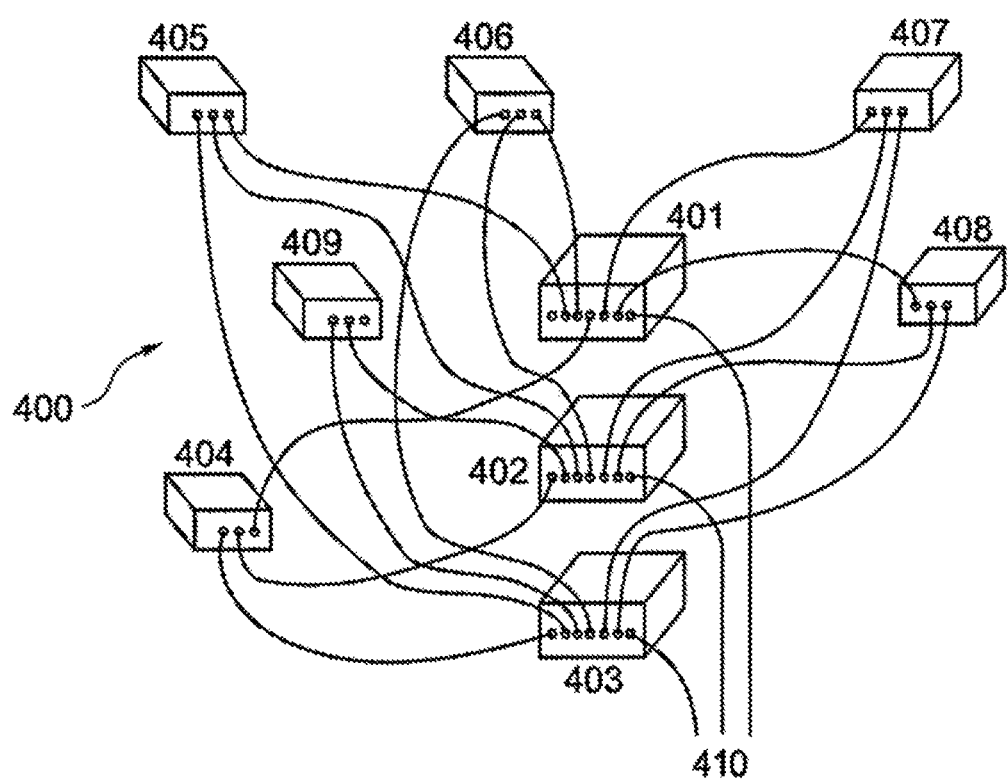
FIG. 4 shows an exemplified double fault-tolerant communication network.

FIG. 4 exemplifies a double fault-tolerant RTCN 400 applying triple redundant communication architecture comprising three communication switches 401-403 and six DCNs 404-409. This structure satisfies the fault-tolerance required for very high system reliability and for mission critical fault-tolerant systems with long mean time to repair after the first failure. Communication with other communication switches is offered via the triple redundant communication path 410.

The invention claimed is:

1. A real-time fault-tolerant control system for a wind power plant comprising a plurality of power units, the control system comprising:
  control means for generating a plurality of power unit set-point values for each power unit of the plurality of power units, wherein the plurality of power unit set-point values correspond to a same control parameter for each power unit of the plurality of power units,
  a data communication network for transmitting the plurality of power unit set-point values to the plurality of power units, wherein the data communication network forms a plurality of multidirectional paths between the plurality of power units wherein each multidirectional path of the plurality of multidirectional paths transmits one value of the plurality of power unit set-point values to the plurality of power units such that when a given power unit of the plurality of power units loses connectivity to the data communication network, remaining power units of the plurality of power units remain able to receive the plurality of power unit set-point values via the data communication network, and such that when a given multidirectional path of the plurality of multidirectional paths loses connectivity to the plurality of power units, remaining multidirectional paths of the plurality of multidirectional paths are able to transmit remaining values of the plurality of power unit set-point values to the plurality of power units, a plurality of decentralized voting means being arranged so that a respective decentralized voting means is assigned to each power unit of the plurality of power units receiving the plurality of power unit set-point values, wherein each decentralized voting means of the plurality of decentralized voting means is adapted to determine two comparable but different valid power unit set-point values out of the plurality of power unit set-point values using a two-out-of-three (2OO3) voting scheme where a deviation among the plurality of power unit set-point values is used to determine the two comparable but different valid power unit set-point values and one invalid power unit set-point value in the plurality of power unit set-point values, and wherein the plurality of decentralized voting means is adapted to select one valid power unit set-point value from the two comparable but different valid power unit set-point values.

2. The real-time fault-tolerant control system according to claim 1, further comprising centralized main controller means adapted to generate reference signals for the control means for generating the plurality of power unit set-point values.

3. The real-time fault-tolerant control system according to claim 1, further comprising a fault-tolerant sensor system comprising a plurality of sensors.

4. The real-time fault-tolerant control system according to claim 3, wherein the plurality of sensors are arranged in a redundant manner.

5. The real-time fault-tolerant control system according to claim 3, wherein the plurality of sensors are adapted to measure at least one electrical parameter at or near a point of common coupling.

6. The real-time fault-tolerant control system according to claim 1, wherein the data communication network comprises a real-time communication network.

7. The real-time fault-tolerant control system according to claim 6, wherein the real-time communication network comprises a time-triggered Ethernet providing synchronization of data communication.

8. The real-time fault-tolerant control system according to claim 7, wherein the time-triggered Ethernet communication network is implemented as a single fault-tolerant network.

9. The real-time fault-tolerant control system according to claim 7, wherein the time triggered Ethernet communication network is implemented as a double fault-tolerant network.

10. The real-time fault-tolerant control system according to claim 6, wherein the real-time communication network supports safety-related communication of data.

11. The real-time fault-tolerant control system according to claim 1, further comprising means for establishing a global time.

12. A wind power plant comprising:
a plurality of power units; and
a real-time fault-tolerant control system, comprising:
control means for generating a plurality of power unit set-point values of a same control parameter for each of the plurality of power units,
a data communication network for transmitting the plurality of power unit set-point values to the plurality of power units, wherein the data communication network forms a plurality of multidirectional paths between the plurality of power units wherein each multidirectional path of the plurality of multidirectional paths transmits one value of the plurality of power unit set-point values to the plurality of power units such that when a given power unit of the plurality of power units loses connectivity to the data communication network, remaining power units of the plurality of power units remain able to receive the plurality of power unit set-point values via the data communication network, and such that when a given multidirectional path of the plurality of multidirectional paths loses connectivity to the plurality of power units, remaining multidirectional paths of the plurality of multidirectional paths are able to transmit remaining values of the plurality of power unit set-point values to the plurality of power units, and
a plurality of decentralized voting means being arranged so that a respective decentralized voting means is assigned to each of the plurality of power units receiving the plurality of power unit set-point values, wherein each of the plurality of decentralized voting means is adapted to determine two comparable but different valid power unit set-point values out of the plurality of power unit set-point values using a two-out-of-three (2OO3) voting scheme where a deviation among the plurality of power unit set-point values is used to determine the two comparable but different valid power unit set-point values and one invalid power unit set-point value in the plurality of power unit set-point values, and wherein the plurality of decentralized voting means is adapted to select one valid power unit set-point value from the two comparable but different valid power unit set-point values.

13. The wind power plant according to claim 12, wherein the plurality of power units comprise one or more wind turbines.

14. The wind power plant according to claim 12, wherein the plurality of power units comprise one or more energy storage units.

15. A method for controlling, in real-time, a wind power plant comprising a plurality of power units, the method comprising:
generating a plurality of power unit set-point values of a same control parameter for each of the plurality of power units,
transmitting the plurality of power unit set-point values to the power units in the wind power plant via a data communication network, wherein the data communication network forms a plurality of multidirectional paths between the plurality of power units wherein each multidirectional path of the plurality of multidirectional paths transmits one value of the plurality of power unit set-point values to the plurality of power units such that when a given power unit of the plurality of power units loses connectivity to the data communication network, remaining power units of the plurality of power units remain able to receive the plurality of power unit set-point values via the data communication network, and such that when a given multidirectional path of the plurality of multidirectional paths loses connectivity to the plurality of power units, remaining multidirectional paths of the plurality of multidirectional paths are able to transmit remaining values of the plurality of power unit set-point values to the plurality of power units, performing, at each power unit receiving the plurality of power unit set-point values, a decentralized voting process comprising the step of determining two comparable but different valid power unit set-point values out of the plurality of power unit set-point values using a two-out-of-three (2OO3) voting scheme where a deviation among the plurality of power unit set-point values is used to determine the two comparable but different valid power unit set-point values and one invalid power unit set-point value in the plurality of power unit set-point values, and wherein the decentralized voting process further comprises selecting one valid power unit set-point value from the two comparable but different valid power unit set-point values, and applying, at each power unit, the selected valid power unit set-point value to the power unit.

16. The method according to claim 15, wherein the selected power unit set-point value is applied to a number of wind turbines in the wind power plant.

17. The method according to claim 15, wherein the selected power unit set-point value is applied to a number of energy storage units in the wind power plant.

18. The method according to claim 15, wherein the selected power unit set-point value is applied to all power units in the wind power plant.

19. The real-time fault-tolerant control system according to claim 1, wherein the number of the plurality of power unit set-point values generated by the control means depends on a fault tolerance level of the control system for the wind power plant.

20. The real-time fault-tolerant control system according to claim 1, wherein the deviation between the two valid power unit set-point values is less significant than the deviation between the invalid power unit set-point value and either one of the two valid power unit set-point values.

* * * * *